United States Patent [19]

Ohsaki et al.

[11] Patent Number: 5,410,533
[45] Date of Patent: Apr. 25, 1995

[54] VIBRATION PROOFING MECHANISM

[75] Inventors: Kiyoshi Ohsaki, Tokyo; Masato Watanabe, Akishima, both of Japan

[73] Assignee: Kabushiki Kaisha Kenwood, Tokyo, Japan

[21] Appl. No.: 858,046

[22] Filed: Mar. 26, 1992

[30] Foreign Application Priority Data

Apr. 4, 1991 [JP] Japan ............................. 3-030398 U

[51] Int. Cl.$^6$ .............................................. G11B 33/08
[52] U.S. Cl. .................................... 369/263; 369/75.1; 360/97.02
[58] Field of Search ............... 369/263, 75.1; 248/581, 248/624, 625, 638; 206/521; 360/97.02, 97.03

[56] References Cited

U.S. PATENT DOCUMENTS

| 2,397,804 | 4/1946 | Nakken et al. | |
|---|---|---|---|
| 4,981,215 | 1/1991 | Ilic | 206/521 |
| 5,042,024 | 8/1991 | Kurosawa et al. | 369/75.1 |
| 5,142,522 | 8/1992 | Muramatsu | 369/75.1 |

FOREIGN PATENT DOCUMENTS 0197159 10/1986 European Pat. Off. .
0210497  2/1987 European Pat. Off. .

*Primary Examiner*—Stuart Levy
*Assistant Examiner*—Paul J. Ditmyer
*Attorney, Agent, or Firm*—Sixbey, Friedman, Leedom & Ferguson; Gerald J. Ferguson,, Jr.

[57] ABSTRACT

A vibration proofing mechanism whose springs are not required to be newly extended when the mounting position of an apparatus using the mechanism is changed. Two types of vibration proofing springs extend between the cabinet of the apparatus and a floating chassis in different directions. A displacement adjusting spring extends between a spring latch movably supported by the cabinet and the floating chassis. The displacement adjusting spring corrects the displacement of the floating chassis relative to the cabinet caused by the force acting to the vibration proofing springs in the direction different from the direction of gravitational force.

4 Claims, 2 Drawing Sheets

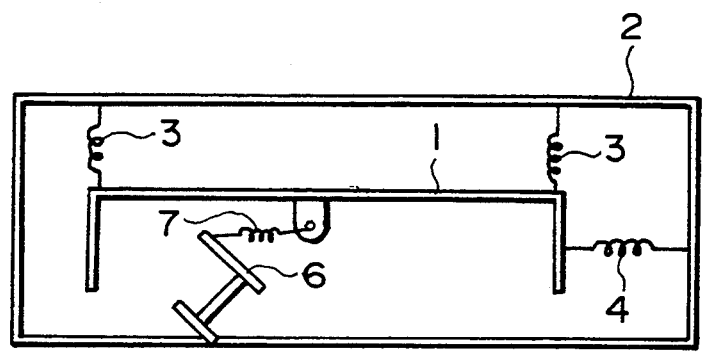
FIG. IA
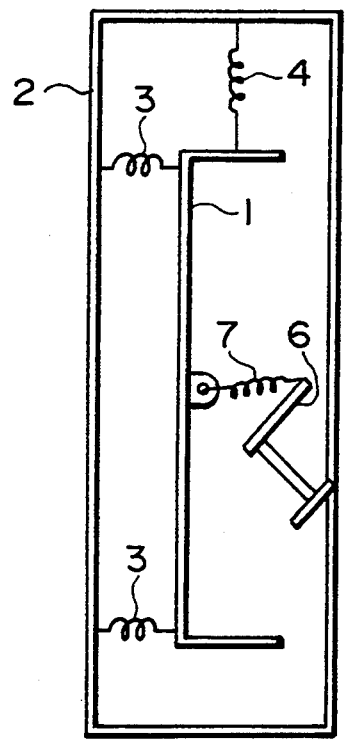
FIG. IB

VIBRATION PROOFING MECHANISM

BACKGROUND OF THE INVENTION

1. Field of the Invention

The present invention relates to a vibration proofing mechanism used for apparatus whose mounting position can be changed, and particularly suitable for application to optical disk players.

2. Description of the Related Background Art

FIG. 3A and 3B show an example of the structure of a vibration proofing mechanism of a conventional optical player capable of taking two mounting positions. In FIG. 3A and 3B, the cabinet D of the player is shown transparent so as to indicate the interior thereof. As shown in FIG. 3A and 3B, if the optical disk player is used at a horizontal mounting position, vibration proofing springs B extend between a floating chassis B and the cabinet D so as to horizontally suspend the floating chassis B. If the optical disk player is used at a vertical mounting position, blanking panels C are opened to disconnect the vibration proofing springs B from the original positions and thereafter extend them again between the cabinet D and floating chassis B at different positions as shown in FIGS. 3A and 3B, so as to vertically suspend the floating chassis B.

With the conventional vibration proofing mechanism described above: vibration proofing springs are required to be disconnected once and thereafter extended at different positions, so as to meet a changed mounting position of the apparatus. The number of vibration proofing springs is two at the minimum, or in some case four springs are used. Thereafter, the work of extending again springs at different positions is cumbersome and time consuming. Moreover, two blanking panels are required, resulting in high production cost of the apparatus.

SUMMARY OF THE INVENTION

The present invention has been made in consideration of the above circumstances. It is therefore an object of the present invention to provide a vibration proofing mechanism capable of readily changing the mounting position of an apparatus and reducing production cost.

According to one aspect of the present invention, provided is a vibration proofing mechanism for an apparatus having a floating chassis supported by springs in a floating and vibration proof state, the apparatus being adapted to take different mounting positions, the vibration proofing mechanism comprising:

a predetermined number of first vibration proofing springs extending between the cabinet of the apparatus and the floating chassis in one direction;

a predetermined number of second vibration proofing springs extended between the cabinet of the apparatus and the floating chassis in another direction different from the one direction; and a displacement adjusting spring extending between a spring latch and the floating chassis, for correcting the displacement of the floating chassis relative to the cabinet, the spring latch being movably supported by the cabinet, the displacement being caused by a force applied to ones of the first and second vibration proofing springs, and said force having a direction different from the direction of gravitational force.

According to the vibration proofing mechanism of the present invention, the direction of total force applied to the vibration proofing springs takes a predetermined direction relative to the floating chassis. The direction of gravitational force applied to the floating chassis changes by 90 degrees between the horizontal and vertical mounting positions of the apparatus which uses the vibration proofing mechanism. The total of the force applied to the vibration proofing springs and the gravitational force applied to the floating chassis is represented by two vectors. The position of the spring latch for the displacement adjusting spring is changed between the vertical and horizontal mounting positions, so that a force having the same strength as, and opposite direction to, those of the two vectors is applied to the floating chassis. Therefore, even the mounting position of the apparatus changes, the position of the floating chassis relative to the cabinet can be maintained unchanged.

BRIEF DESCRIPTION OF THE DRAWINGS

FIG. 1A is a side view showing an optical disk player at its horizontal mounting position, using a vibration proofing mechanism according to an embodiment of the present invention, and FIG. 1B is a side view showing the optical disk player at its vertical mounting position shown in FIG. 1A.

DETAILED DESCRIPTION OF THE PREFERRED EMBODIMENT

A preferred embodiment of the vibration proofing mechanism according to the present invention will be described with reference to the accompanying drawings.

FIG. 1A is a side view showing an optical disk player at its horizontal mounting position, using a vibration disk player at its horizontal mounting position, using a vibration proofing mechanism according to an embodiment of the present invention, and FIG. 1B is a side view showing the optical disk player at its vertical mounting position shown in FIG. 1A. In FIGS. 1A and 1B, the cabinet 2 of the optical disk player is shown transparent so as to indicate the interior of the player. Four vibration proofing springs 3 and two vibration proofing springs 4 extend between a floating chassis 1 and the cabinet 2 so that the vibration proofing springs 3 and the vibration proofing springs 4 are substantially perpendicularly oriented with respect to each other. Thus, the directions of force applied to the vibration proofing springs 3 and 4 are different by 90 degrees. The direction of force applied to the vibration proofing springs 3 is vertical when the player is placed at its horizontal mounting position, whereas the direction of force applied to the vibration proofing springs 4 is vertical when the player is placed at its vertical mounting position. Moreover, as can be seen from FIG. 1A, when the player is placed in its horizontal mounting position so that the vibration proofing springs 3 support the weight of chassis 1, the vibration proofing springs 4 are substantially not active for suspension of the weight of the chassis, Furthermore, as can be seen in FIG. 1 B, when the springs 4 suspend the weight of the chassis in the vertical mounting position of the player, the springs 3 are substantially not active for suspending the weight of the chassis 1.

Figure 2:
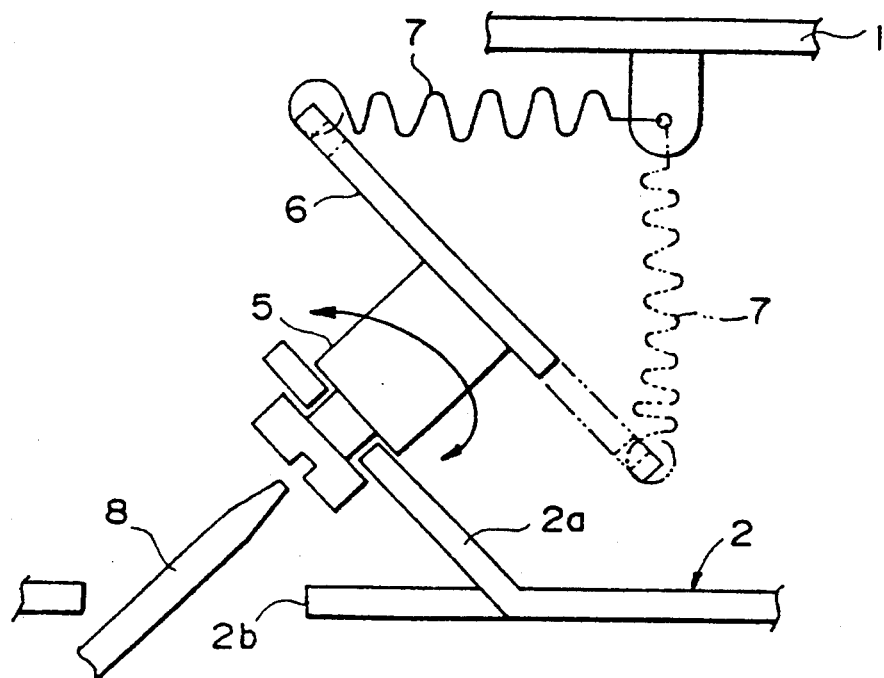
FIG. 2 is an enlarged and detailed view showing part of the optical disk player shown in FIG. 1A.
Figure 3A:
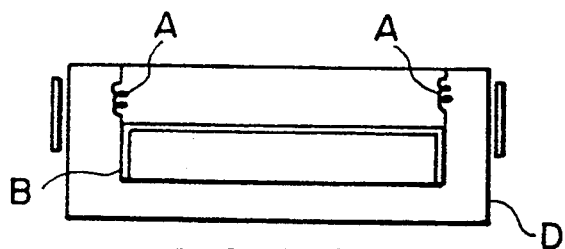
FIG. 3A is a front view of an optical disk player at its horizontal mounting position, using a conventional vibration proofing mechanism.
Figure 3B:
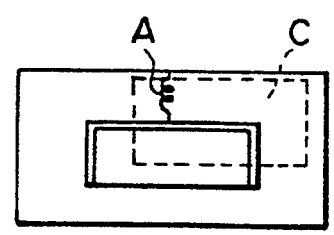
FIG. 3B is a side view of the optical disk player at its horizontal mounting position shown in FIG. 3A.
Figure 3C:
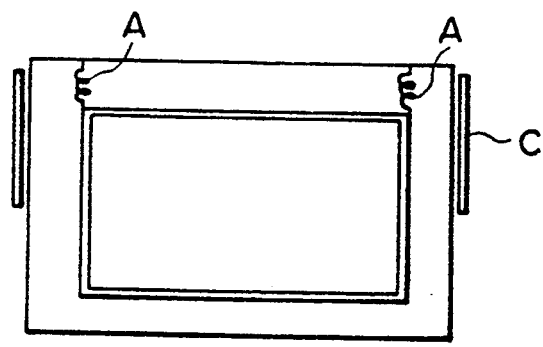
FIG. 3C is a front view of the optical disk player at its vertical mounting position shown in FIG. 3A.
Figure 3D:
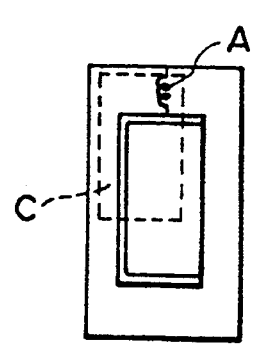
FIG. 3D is a side view of the optical disk player at its vertical mounting position shown in FIG. 3C.

A displacement adjusting spring 7 extends between the floating chassis 1 and a spring latch 6. As shown in detail in FIG. 2, the spring latch 6 is fixedly mounted on a rotary shaft 5 which is rotatably supported by a tongue 2a made by partially cutting the wall of the cabinet 2 and raising it inward within the cabinet 2. The rotary shaft 5 can be rotated using a screw driver 8 by inserting it via an opening, which was formed in the wall of the cabinet at the place under the tongue, in a notch formed in the bottom of the rotary shaft 5. Although not shown, the rotary shaft 5 is provided with stoppers for stably stopping it at two positions different by 180 degrees.

The spring moduli of the vibration proofing springs are determined so as to satisfy the following equation:

$$W = 4Wa = 2Wb = Wc$$

where is a weight of the floating chassis 1, Wa is a force applied to each vibration proofing spring 3, Wb is a force applied to each vibration proofing spring 4, and Wc is a force applied to the displacement adjusting spring 7.

In operation of the vibration proofing mechanism constructed as above, if the optical disk player takes its horizontal mounting position as shown in FIG. 1A, the rotation position of the rotary shaft 5 is set such that the direction of force applied to the displacement adjusting spring 7 becomes horizontal. In this condition, the weight of the floating chassis 1, or gravitational force applied to it, equilibrates the force applied to the vibration proofing springs 3, and the force applied to the vibration proofing springs 4 equilibrates the force applied to the displacement adjusting spring 7. If the optical disk player takes its vertical position as shown in FIG. 1B, the rotary shaft 5 is rotated to the position where the direction of force applied to the displacement adjusting spring 7 becomes horizontal. In this condition, the gravitational force applied to the floating chassis 1 equilibrates the force applied to the vibration proofing springs 4, and the force applied to the vibration proofing springs 3 equilibrates the force applied to the displacement adjusting spring 7. In such a manner, the position of the floating chassis 1 relative to the cabinet 2 will not change between the vertical and horizontal mounting positions of the player.

According to the vibration proofing mechanism of the present invention, it is not necessary, for the operation of changing the mounting position, to disconnect vibration proofing springs and thereafter extend them again. The mounting position of the player can be easily changed by any novice using a jig such as a screw driver. Furthermore, conventional blanking plates covering windows are not necessary, reducing production cost of the player.

What is claimed is:

1. A vibration proofing mechanism for an apparatus having a floating chassis supported to a cabinet by springs in a floating and vibration proof state, said apparatus being adapted to take two different mounting positions, said vibration proofing mechanism comprising:

a predetermined number of first vibration proofing springs (3) extending between the cabinet (2) of said apparatus and said floating chassis for suspension of a weight of the chassis in one direction corresponding to a first one of said two mounting positions of the apparatus;

a predetermined number of second vibration proofing springs (4) extending between the cabinet of said apparatus and said floating chassis for suspension of the weight of the chassis in another direction different from said one direction corresponding to the second one of said two mounting positions of the apparatus whereby said first set of vibration proofing springs and said second set of vibration proofing springs are substantially perpendicularly oriented with respect to each other whereby (a) said second vibration proofing springs are substantially not active for suspension of the weight of the chassis when the weight of the chassis is supported by the first vibration proofing springs in the first one of the mounting positions of the apparatus and (b) said first vibration proofing springs are substantially not active for suspension of the weight of the chassis when the weight of the chassis is supported by the second vibration proofing springs in the second one of the mounting positions of the apparatus; and a displacement adjusting spring (7) extending between a spring latch (6) and said floating chassis, for correcting the displacement of said floating chassis relative to the cabinet, said spring latch being movably supported by the cabinet, and being adjustable to (a) apply a first force to the chassis (1), said first force compensating for a force applied by said second vibration proofing springs to the chassis when the second vibration proofing springs are substantially not active for suspension of the weight of the chassis in the first one of the mounting positions of the apparatus and (b) apply a second force to the chassis, said second force compensating for a force applied by said first vibration proofing springs to the chassis when the first vibration proofing springs are substantially not active for suspension of the weight of the chassis in the second one of the mounting positions of the apparatus.

2. A vibration proofing mechanism according to claim 1, wherein said one direction is horizontal said other direction is vertical, and a direction of said force applied to by said first and second vibration proofing springs (3,4) substantially not active for suspension is horizontal and perpendicular to the direction of gravitational force.

3. A vibration proofing mechanism according to claim 1, wherein said cabinet has a wall and said spring latch is fixedly mounted on a rotary shaft, said rotary shaft being rotatably supported by a tongue formed by partially cutting the wall of the cabinet.

4. A vibration proofing mechanism according to claim 3, wherein a notch is formed in said rotary shaft, said notch being accessible externally of said cabinet to rotate said rotary shaft.

* * * * *